United States Patent [19]

Brown et al.

[11] Patent Number: 4,977,003

[45] Date of Patent: Dec. 11, 1990

[54] NONTACKY ACRYLONITRILE/BUTADIENE ADHESIVE TAPE

[75] Inventors: Robert C. Brown, Falcon Heights; Shih-Lai Lu, Woodbury, both of Minn.

[73] Assignee: Minnesota Mining and Manufacturing Company, St. Paul, Minn.

[21] Appl. No.: 703,299

[22] Filed: Feb. 20, 1985

[51] Int. Cl.$^5$ .............................................. B32B 7/12
[52] U.S. Cl. ................................... 428/35.5; 206/484; 206/813; 215/347; 220/359; 428/35.8; 428/195; 428/343; 428/352; 428/355; 428/36.92
[58] Field of Search ................. 428/35, 343, 344, 352, 428/355, 356, 195, 36.92, 35.8; 215/347; 206/484; 220/270, 359; 383/5

[56] References Cited

U.S. PATENT DOCUMENTS

| | | | |
|---|---|---|---|
| 2,535,852 | 12/1950 | Hatfield et al. | 260/27 |
| 2,601,016 | 6/1952 | Hendricks et al. | 117/122 |
| 2,819,010 | 1/1958 | Amiguet | 383/5 |
| 2,879,252 | 3/1959 | Been et al. | 260/45.5 |
| 3,076,588 | 1/1963 | Conway et al. | 229/3.5 |
| 3,330,720 | 7/1967 | Stevens et al. | 428/355 |
| 3,339,788 | 9/1967 | Lipske | 222/541 |
| 3,380,938 | 4/1968 | Jack et al. | 428/356 |
| 3,406,039 | 10/1968 | Paufler | 428/355 |
| 3,455,859 | 5/1966 | Korpman | 428/355 |
| 3,741,786 | 6/1973 | Torrey | 117/3.1 |
| 3,861,956 | 1/1975 | Schwarcz | 428/355 |
| 3,924,748 | 12/1975 | Braverman | 206/538 |
| 4,102,835 | 6/1978 | Freeman et al. | 428/356 |
| 4,166,706 | 10/1979 | Korpman | 428/355 |
| 4,212,912 | 7/1980 | Wartusch et al. | 428/215 |
| 4,230,761 | 10/1980 | Watts | 428/215 |
| 4,248,917 | 2/1981 | Hornibrook et al. | 428/356 |
| 4,483,018 | 11/1984 | Whelan | 383/5 |

OTHER PUBLICATIONS

The B. F. Goodrich publication, Mar. 1981.

Primary Examiner—James J. Seidleck
Attorney, Agent, or Firm—Donald M. Sell; Walter N. Kirn; Richard E. Brink

[57] ABSTRACT

Adhesive tape, the adhesive layer of which comprises a copolymer of (a) acrylonitrile and (b) butadiene and/or isoprene. Even though such an adhesive copolymer layer is usually substantially nontacky, it forms under moderate pressure bonds to many substrates which become stronger than the substrates. The bonds become strong more quickly when heated while the pressure is being applied. For a usefully long period of time after initiating a bond, the tape usually is repositionable.

21 Claims, 1 Drawing Sheet

NONTACKY ACRYLONITRILE/BUTADIENE ADHESIVE TAPE

FIELD OF THE INVENTION

The invention concerns adhesive tapes which usually are produced in wide widths, sometimes called "jumbos", that may be slit to narrow widths to be wound upon themselves in roll form for storage or shipment in commerce. The invention also concerns adhesive tapes which are produced or dispensed in the form of individual sheets. The adhesive layers of the tapes of the invention usually are substantially nontacky and yet under moderate pressure form bonds that develop surprisingly high strength that may exceed the strengths of materials to which the novel tapes are bonded. The backings of the novel tapes may either be removable or may permanently remain with the adhesive layer after it has been applied to an intended use.

BACKGROUND ART

Blister packs are usually sealed with an adhesive coating using heat and pressure, but the need to maintain the pressure while waiting for the adhesive coating to be heated to form a bond requires the equipment to be operated at slower speeds than would be feasible if the bond were formed more quickly. The heated platens must be aligned with precision, thus requiring the equipment to be expensive both to fabricate and to operate. Each style of blister pack requires a unique platen or set of platens.

Pressure-sensitive adhesives have been used for sealing blister packs, but involve problems that have limited their use. For example, their tacky nature makes it desirable that they be applied only in areas of contact between the flanges of the blisters and the cardboard or other material on which the blisters are mounted. This is difficult to control, and slight misalignment might allow the contents to contact the tacky adhesive or allow the listers to open accidentally.

Heat applied in the sealing of a blister pack, often at temperatures of 175° C., can damage items being packaged, even though the damage may not be evident. For example, medical pills, i.e., capsules or tablets, are often individually packaged by a pharmacist in medication cards having one punch-open compartment per pill, and the small size of each compartment brings the heat close to each pill. The pharmacist might not be aware of the deleterious effect that such heat may have on specific medications, and it is believed that for this reason such equipment is banned in the United Kingdom. Where such equipment is used, a preheating delay is required and there are safety hazards. During periods of hot weather, pharmacists complain about heat discharged into the working area.

A variety of other types of containers also are sealed by adhesive coatings using heat and pressure, and the speed at which the sealing equipment can be operated is likewise reduced by the delay in forming bonds.

Labels often are applied to containers and other objects using adhesive coatings that are sealed by heat and pressure. In addition to involving the aforementioned time delays, the labels, if misaligned, cannot be economically repositioned. Instead, solvent-activated adhesives are often used even though they involve similar time delays and set so quickly that repositioning is impractical. While pressure-sensitive adhesives eliminate such delays, those that that are sufficiently aggressive to make the labels tamper-resistant do not permit repositioning of misaligned labels.

Neither solvent-activated nor heat-activated adhesives are practical for many important applications such as adhering body-side molding to an automobile, thus requiring the use of pressure-sensitive adhesives, but for applications that require strong, permanent bonding, misalignment often cannot be economically corrected.

Some containers are sealed using heat-activated adhesives, e.g., peel-open tabs that close openings in the lids of drink-containing cans. The speed of sealing such closures also is reduced by the delay in forming the bond. The operating speed of equipment for heat-fusing two articles is likewise limited by the time delay to fuse material. For example, documents such as drivers' licenses are often protected between two heat-sealable plastic sheets. Such equipment is expensive and its high temperatures involve a safety hazard.

OTHER PRIOR ART

Copolymers of acrylonitrile and butadiene, often called "nitrile rubber", are sold by B. F. Goodrich Co. under the trade name "Hycar" such as "Hycar 1001". Because they are emulsion polymerized, they contain trace amounts of surfactant, even after being washed by the manufacturers to remove the surfactant. According to a 50-page booklet of B. F. Goodrich entitled "Materials for Adhesives" dated March 1981, when nitrile rubber is used in an adhesive, it should be combined with tackifiers, softeners, resins, or other rubbers (pages 5, 8, 9, and 47) and often is combined with curing agents (page 6) such as an isocyanate prepolymer (page 11). Copolymers of acrylonitrile and isoprene also are readily commercially available, but it is believed that when used as adhesives, they also have always been combined with the aforementioned modifiers.

In U.S. Pat. No. 4,212,912, an adhesive layer comprising an acrylonitrile/butadiene copolymer employs an organic peroxide to crosslink the copolymer.

DISCLOSURE OF INVENTION

The invention provides an adhesive tape, the adhesive layer of which may be substantially nontacky, but surprisingly is capable under moderate pressure at ordinary room temperatures of bonding to many articles so aggressively that the bonds can be stronger than the articles. Although the bonds reach full strength more quickly when heat is applied, testing indicates that a bond initiated at ordinary room temperature under moderate pressure reaches substantially the same strength overnight as does a bond initiated while applying heat. Even so, an article such as a label which is bonded to a substrate such as a container can readily be repositioned during a reasonably long period of time after being formed, whether or not heat is employed in initiating the bond. In spite of such repositionability, a bond initiated at room temperature or at a moderately elevated temperature under moderate pressure has sufficient initial strength that there is no delay in operating high-speed equipment (in contrast to the delays discussed above under "Background Art"). Accordingly, the novel adhesive tape should make it feasible to design and manufacture higher speed equipment for such purposes as sealing blister packs, sealing containers, and applying labels.

Briefly, the adhesive tape of the invention comprises a backing and an adhesive layer which in turn comprises an uncrosslinked copolymer of (a) 10 to 50 weight percent of acrylonitrile and (b) 50 to 90 weight percent of at least one of butadiene and isoprene. The copolymer has a Mooney viscosity (ML-4 at 100° C.) of from 30 to 95, and the adhesive copolymer layer should have a water contact angle of at least 20°, preferably at least 50°. Otherwise it may have inadequate adhesion. When the water contact angle is at least 50°, the tape can be expected to provide a 180° Peelback value (as defined hereinbelow) of at least 45 N/dm.

In view of the fact that manufacturers of such copolymers teach that they should be combined with various modifiers to be used as adhesives, it is surprising that the adhesive copolymer layer of the novel tape should form such strong bonds merely by applying moderate pressure at ordinary room temperatures. Preferably monomer (a) provides at most 40 weight percent of the copolymer, above which the adhesive copolymer layer may be rather firm, thus making it more desirable to apply heat during bonding, and this would limit the versatility of the tape. When monomer (a) provides less than 20 weight percent of the copolymer, the adhesive copolymer layer may be somewhat soft for uses requiring bonds of great strength.

The copolymer used in making the adhesive copolymer layer of the novel tape may be hydrogenated, as is a highly saturated copolymer of about 37 parts of acrylonitrile and 63 parts by weight of butadiene marketed by Nippon Zeon Co., Ltd. of Japan as "Zetpol 2010" which has a Mooney viscosity of 85 and a water contact angle of 83°.

The adhesive copolymer layer of the novel tape may contain a filler such as calcium carbonate, carbon black, glass beads or microbubbles, short fibers such as glass or nylon, silica, magnesium oxide, and talc. Such fillers tend to reduce adhesion both to articles to which the adhesive layer may be bonded and to articles which the adhesive layer may casually contact. By controlling the amount of filler, the novel tape can form reclosable bonds for use in reclosable bags, boxes, and mailing envelops. Because the adhesive copolymer layer of the novel tape has limited adhesion to polyolefins, it can be used with them in reclosable products even though it does not contain a filler.

While the adhesive copolymer layer of the novel tape usually is substantially nontacky, tackiness can be imparted or enhanced by including in the adhesive layer a liquid copolymer of the monomers (a) and (b) in amounts providing up to about 40 percent by weight of the adhesive layer. A useful liquid copolymer of acrylonitrile and butadiene is marketed by Nippon Zeon as "Nipol N-30L".

For many uses, a backing member of the novel tape has a low-adhesion surface to permit the adhesive copolymer layer to be transferred to bond two articles together. For some uses, a backing may be permanently adhered to the adhesive copolymer layer to become part of the final product. For example, when a backing is a transparent plastic film, it may form one of the surface layers of a laminate which protects a document such as a driver's license.

Because the adhesive copolymer of the novel tape adheres strongly to polyvinyl chloride, polycarbonate and polystyrene films, those films are particularly useful in tapes requiring a permanently adhered backing. The same polymers may be used as coatings for paper backings of the novel tape. The adhesive copolymer also adheres strongly to acrylates such as polymethylmethacrylate. Because the adhesive copolymer does not adhere strongly to polyolefin films and only moderately to polyester films, such films may first be given adhesion-promoting treatments such as corona discharge.

When backings such as polyvinyl chloride are plasticized, their plasticizers may migrate into the adhesive copolymer layer. This tends to produce a substantial increase in tackiness and adhesion with very little attendant reduction in cohesion.

The adhesive copolymer layer may be coated onto or transferred to cover the entire surface of the type of metal foil and paper laminate, thus providing a tape of the invention that is useful for making medication cards having one punch-open compartment per pill. The flanges of a multi-compartment blister may be adhered to the adhesive copolymer layer of a foil-paper-backed tape by applying moderate pressure at room temperature, thus providing a tamper-resistant seal for the medication. Because it is substantially nontacky, the adhesive copolymer layer does not become strongly bonded to the pills, which hence are easily removed from their compartments by punching out the foil-paper laminate. In contrast to the heated platen presses previously required, a pharmacist can make a medication card simply by laying a sheet of foil-paper-backed tape of the invention over a multi-compartment blister and sealing the adhesive copolymer to the blister by hand with an unheated roller.

Instead of initially being applied to a foil-paper backing, the adhesive copolymer may be applied to a strong, transparent, thermoplastic film backing of which the blister is to be formed, e.g., polyvinyl chloride film. Because the adhesive copolymer of this tape can be nontacky or virtually nontacky, it can be directly contacted by the heated platens during the thermoforming of the adhesive bearing thermoplastic film. Because the adhesive copolymer is transparent unless modified in some way, blisters formed from the adhesive-bearing film backing can be transparent. To permit the tape to be marketed in roll form without a disposable liner, the other surface of the film backing may be covered by a thin, transparent, thermoplastic release layer which is strongly adherent to the backing member and to which said adhesive layer is poorly adherent. When the backing film is polyvinyl chloride, a preferred release layer is an ethylene/vinyl acetate copolymer and for economy preferably is very thin, e.g., from 0.01 to 0.03 mm in thickness. Pieces or sheets dispensed from a roll can be thermoformed to provide multi-compartment blisters which a pharmacist would use to make a medication card. After placing capsules in the compartments, the pharmacist would cover the compartments with a foil-paper laminate, and then seal the adhesive copolymer to the laminate by hand with an unheated roller.

To avoid transferring the entire adhesive copolymer layer from a piece of the novel tape, the adhesive copolymer layer may consist of an orderly pattern of closely spaced segments, the widths of which are small compared to the width of the tape. Similar pressure-sensitive adhesive segments are described and illustrated in U.S. Pat. No. 3,741,786 (Torrey). When using a sheet of such a patterned tape to transfer adhesive to the face of a blister, only those segments of the adhesive copolymer layer which contact the flanges of the blister are transferred.

THE DRAWING

In the drawing, all figures of which are schematic:

Figure 1:
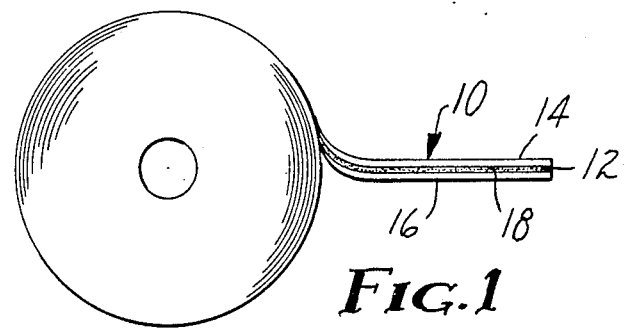
FIG. 1 shows a tape of the invention being unwound from roll form.

The tape 10 shown in FIG. 1 comprises an adhesive copolymer layer 12 coated on a flexible backing which is a laminate 14 of metal foil and paper. The other surface of the adhesive copolymer layer 12 is protected by a disposable flexible web 16 which has a low-adhesion surface 18.

Figure 2:
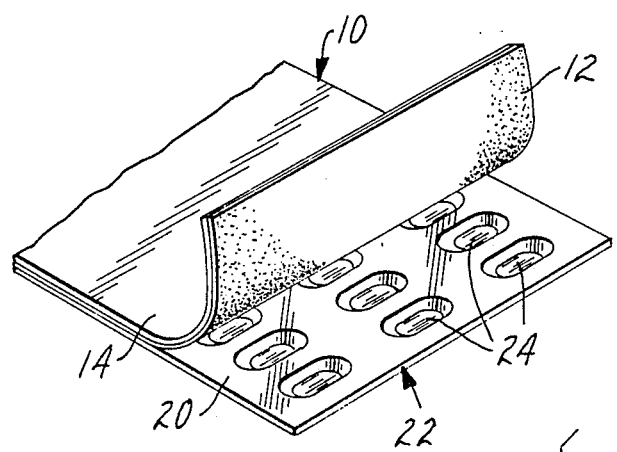
FIG. 2 shows in perspective a sheet of the tape of FIG. 1 being applied to a multi-compartment blister.

FIG. 2 shows a sheet of the tape 10 after the disposable web 16 has been peeled off and discarded. The exposed adhesive copolymer layer 12 is being laid against the flanges 20 of a transparent, multi-compartment blister 22, each compartment of which contains one capsule 24. Pressure is then applied to seal the adhesive layer to the flanges of the blister, thus creating a medication card.

Figure 3:
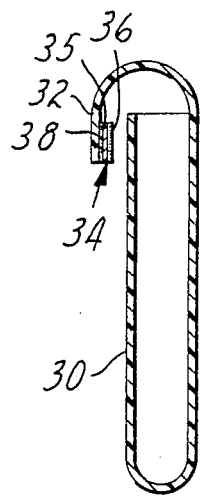
FIG. 3 shows a reclosable container employing a strip of an adhesive tape of the invention.

In FIG. 3, a pouch 30 made of polyethylene film has a flap 32 to which is adhered an adhesive tape 34 of the invention. The tape 34 has a flexible backing 35, one face of which is coated with a substantially nontacky adhesive copolymer layer 36 which comprises a copolymer of the aforementioned monomers (a) and (b). Coated on the other face of the backing member 35 is an aggressive pressure-sensitive adhesive layer 38 which permanently adheres the tape 34 to the flap 32. The pouch may be releasably closed and reclosed by momentarily applying finger pressure to the flap 32 while it contacts the exposed face of the adhesive copolymer layer 36.

Figure 4:
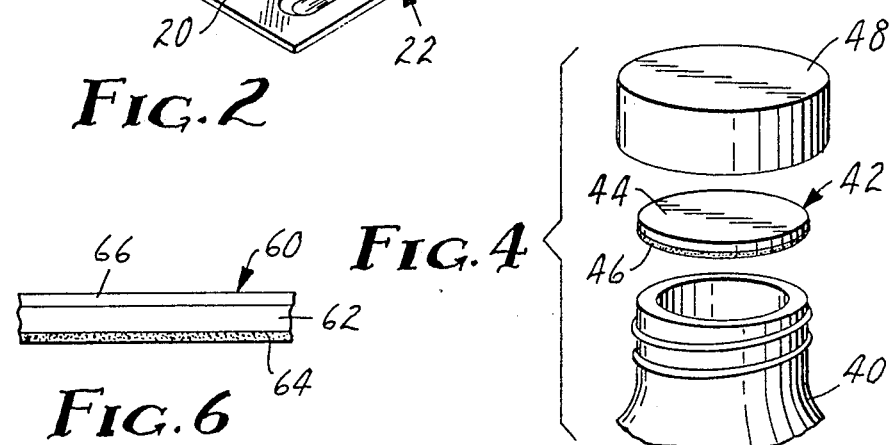
FIG. 4 is an exploded view of a bottle, the cap of which is sealable by a piece of an adhesive tape of the invention.

FIG. 4 shows a polystyrene bottle 40, across the threaded top of which is adhered a piece 42 of an adhesive tape of the invention. The tape has a flexible polymeric film backing 44 permanently adhered to a substantially nontacky adhesive copolymer layer 46. When a L- threaded cap 48 is screwed onto the bottle, the pressure applied as the cap is seated initiates a strong bond between the adhesive copolymer layer 46 and the bottle 40. When the cap is later removed, the film backing 44 resists removal without breaking.

Figure 5:
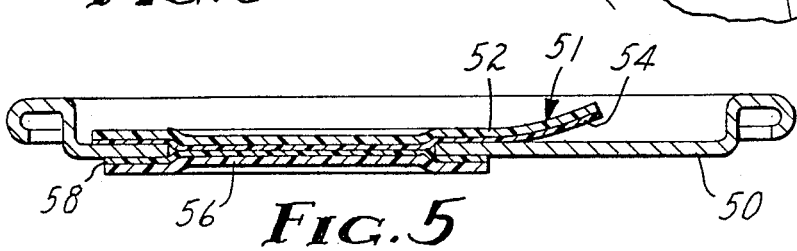
FIG. 5 is a cross-section through the seal of a liquid container, which employs a piece of an adhesive tape of the invention.

FIG. 5 shows the lid 50 of a vinyl-coated metal can having an opening which is covered by a pull-tab 51. The pull-tab preferably comprises a biaxially oriented poly(ethylene terephthalate) film 52 which has an aluminum vapor coating (not shown) to give it a metallic appearance. The under face of the film 52 has an adhesive coating 54 which may either be a pressure-sensitive adhesive or an uncrosslinked acrylonitrile/butadiene copolymer, in which case the pull-tab 51 is an adhesive tape of the invention. Across the underside of the opening is a piece of a tape of the invention having a flexible vinyl chloride film backing 56 and an adhesive copolymer layer 58 which comprises an uncrosslinked acrylonitrile/butadiene copolymer. Preferably, the adhesive copolymer layer 58 includes a liquid acrylonitrile/butadiene copolymer to impart sufficient tackiness so that mere contact between the adhesive copolymer layer 58 and both the edges of the opening in the lid 50 and the adhesive coating 54 of the pull-tab 51 assures that the piece of tape of the invention does not fall off due to gravity. Pressure may be applied so that the bond quickly builds to provide a liquid-tight seal across the opening of the lid 50.

Because acrylonitrile/butadiene copolymers are highly resistant to the essential oils of fruit juices, tapes of the invention should be especially useful for sealing pull tabs of fruit juice cans and cartons.

Figure 6:
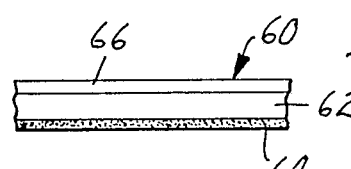
FIG. 6 is an enlarged edge view of a 3-layer composite tape of the invention.

FIG. 6 shows a 3-layer composite tape 60 comprising a strong, transparent, thermoplastic film backing 62, a transparent adhesive copolymer layer 64, and a transparent, thermoplastic release layer 66 which is strongly adherent to the film backing 62, but to which the adhesive copolymer layer 64 is poorly adherent. The composite tape 60 can be wound upon itself in roll form for convenient storage and shipment. Pieces or sheets of the composite tape 60 can be thermoformed into blisters having the same appearance as the blister 22 of FIG. 2.

Water Contact Angle

Maximum advancing angles for sessile water droplets (2-microliter) on the surface of an adhesive layer are measured by the Zisman method using a NRL contact angle goniometer manufactured by Rame Hart Inc. The droplets are examined on at least six random locations. Angles are measured with a precision of ±2°, and the average values are reported.

180° Peelback Value

Test tapes have as their backing members a composite biaxially oriented film (0.05 mm thick) comprising a layer of poly(ethylene terephthalate) (0.04 mm thick) and an amorphous layer of a copolymer of ethylene terephthalate and ethylene isophthalate (80/20 molar ratio). The adhesive to be tested is coated onto the copolymer surface and dried to a thickness of about 0.01 mm.

To test a tape, a strip of unplasticized polyvinyl chloride (pvc) film (5×12.5 cm) is adhered to a flat panel by an equally large piece of double-coated pressure-sensitive adhesive tape. A 2.5-cm strip of tape to be tested is bonded to the pvc surface under the weight of two passes of a 2-kg hard-rubber roller. After 10 minutes dwell time, a free end of the tape is attached to the scale of an Instron Tensile Tester and pulled from the pvc film at an angle of 180° at a speed of 30 cm/min. The 180° Peelback value of the tape is the average of two measurements made after peeling has begun.

In the examples, all parts are by weight unless otherwise noted. Used in the examples were the following copolymers of acrylonitrile and butadiene:

| Trade designation | % acrylonitrile | Mooney** viscosity | Water Contact Angle |
|---|---|---|---|
| "Hycar 1000 × 88" | 43 | 95 | 84° |
| "Hycar 1022" | 33 | 50 | 75° |
| "Nipol DN-1201L"* | 37 | 46 | 83° |
| "Nipol N-30L" | 32 | @ | 55° |
| "Hycar 1042F" | 33 | 80 | 17° |

*terpolymer of acrylonitrile, butadiene and isoprene
**ML-4 at 100° C.
@ Brookfield viscosity 4500–7500 cps at 70° C.

EXAMPLE 1

For use in making a medication card, a paper-foil laminate was made from glazed bleached kraft paper 0.04 mm in thickness, aluminum foil 0.009 mm in thickness, a thin casein neoprene adhesive bonding the paper and foil together, and a shellac coating over the exposed surface of the foil. Over the shellac coating was knife-coated a solution of one part of a copolymer of acrylonitrile and butadiene ("Hycar 1000×88") in 4 parts of methyl ethyl ketone. The coating was dried in an oven to provide a paper-foil-backed adhesive tape of the invention, the dried adhesive copolymer layer of which had a thickness of about 0.015 mm.

Unplasticized polyvinyl chloride film, having a thickness of 0.175 mm, was thermoformed to provide a blister including a plurality of cavities, into each of which a gelatin capsule was inserted. Against the face of the blister was applied, as illustrated in FIG. 2 of the drawing, the adhesive copolymer layer of a piece of the paper-foil-backed tape of this example. Using a hard-rubber roller under moderate hand pressure at room temperature, the adhesive layer was bonded to the flanges of the blister, thus providing a sealed medication card. After punching out the paper-foil laminate, some of the capsules remained adhered to the torn laminate, from which they were easily lifted. Such adhesion may be considered to be an advantage since this helped prevent the capsules from falling on the floor. Those users who may object to any adhesion would prefer to eliminate the slight tackiness of the adhesive layer by instead making a medication card as in Example 2.

EXAMPLE 2

An adhesive tape having a paper-foil backing was made as in Example 1 except that the adhesive layer was coated from a solution of:

| Parts | |
|---|---|
| 95 | "Hycar 1000 × 88" copolymer |
| 27 | Calcium carbonate having an average particle size of about one micrometer |
| 2.3 | Dioctyl phthalate |
| 0.35 | Hollow glass microbubbles generally having an average diameter from 20 to 70 micrometers |
| 480 | Methyl ethyl ketone | and the dried adhesive copolymer layer had a thickness of about 0.02 mm. A piece of the tape was adhered by its adhesive copolymer layer to the flanges of a blister as in Example 1. Individual capsules, when punched out, fell freely from their compartments.

Attempts to carefully peel the paper-foil laminates from the medication cards of Examples 1 and 2 resulted in splitting and tearing of the paper-foil laminates, and both medication cards were adjudged to be highly resistant to unobtrusive tampering.

EXAMPLE 3

An adhesive copolymer solution of the following was prepared by mixing overnight in a laboratory shaker:

| Parts | |
|---|---|
| 100 | Copolymer of acrylonitrile and butadiene, unmilled ("Hycar" 1022) |
| 1.5 | UV absorber stabilizer |
| 1.5 | Antioxidant |
| 461.5 | Methyl ethyl ketone |

The solution was knife-coated onto a disposable paper backing having a silicone low-adhesion treatment on both surfaces and then oven-dried to a thickness of about 0.02 mm. The resulting tape of the invention was wound upon itself in roll form for storage and later unwound and slit to provide rolls about 1 cm in width.

Thermoformed from unplasticized polyvinyl chloride film 0.175 mm in thickness was a blister having overall dimensions of about 5 cm by 10 cm with 0.63-cm wide flanges at its edges. Two strips of the 1-cm tape of this example were applied to the lengthwise edge flanges and, after peeling off the paper backing, the exposed adhesive copolymer faces were placed against printed cardstock, the face of which had a thin, transparent coating of a copolymer of vinyl acetate and vinyl chloride. A hard rubber roller was hand pressed at room temperature to bond the cardstock to the edge flanges. Failure to peel away the cardstock without delamination or tearing indicated that the sealed blister was substantially tamperproof.

EXAMPLE 4

Onto one face of biaxially-oriented poly(ethylene terephthalate) (polyester) film backing of 0.025 mm thickness, both faces of which had been corona treated, was applied an aggressively pressure-sensitive adhesive layer, namely a copolymer of 95.5 parts isooctyl acrylate and 4.5 parts acrylic acid. After covering the pressure-sensitive adhesive layer with a polyethylene film, the other face of the polyester film backing was coated with a solution of acrylonitrile/butadiene adhesive copolymer as in Example 3, thus providing a double-coated adhesive tape of the invention, which was slit to 1 cm in width.

The acrylonitrile/butadiene adhesive copolymer face of two strips of the double-coated tape were pressed against the lengthwise edge flanges of a blister as in Ex. 3. Then after peeling away the polyethylene, the pressure-sensitive adhesive faces were pressed against printed cardstock as in Example 3 except that the cardstock did not have a vinyl coating. Unsuccessful efforts to peel off the cardstock without delaminating or tearing indicated that the sealed blister was virtually tamperproof.

EXAMPLE 5

Onto 0.25-mm unplasticized polyvinylchloride film backing was extruded a 0.013-mm adhesive copolymer layer of acrylonitrile/butadiene/isoprene terpolymer ("Nipol DN-1201L") at a temperature of 127° C. to provide a tape of the invention. After covering the adhesive copolymer layer with a disposable polyethylene film, the whole was wound upon itself for storage. This was later unwound and, after removing the polyethylene film, a piece of the tape was thermoformed at a platen temperature of 230°–260° C. (6 seconds at 585 kPa) to provide a multi-compartment blister as illustrated in FIG. 2. The flanges and inner faces of the blister compartments were faced with the adhesive copolymer layer. The adhesive-bearing flanges of the blister were contacted to a paper-foil laminate such as that used in Example 1, except that instead of a shellac coating, it had a vinyl acetate/vinyl chloride copolymer coating. After applying hand pressure with a hard-rubber roller and leaving the resulting medication card overnight at room temperature, the paper-foil laminate could not be peeled away without delaminating or tearing, thus indicating good tamper resistance. Individual gelatin capsules punched from the card fell freely from blister compartments.

EXAMPLE 6

Onto 0.25-mm unplasticized polyvinylchloride film was extruded a 0.013-mm adhesive copolymer layer of acrylonitrile/butadiene/isoprene terpolymer ("Nipol DN-1201L") at a temperature of 127° C. Onto the other face of the polyvinylchloride film was extruded a 0.05-mm layer of a copolymer of ethylene and vinyl acetate ("Elvax 660" of E.I. duPont de Nemours) to provide a 3-layer composite tape of the invention which was wound upon itself for convenient storage. The adhesive copolymer layer was only lightly adhered to the ethylene/vinyl acetate copolymer layer after several days in roll form at 30° C. It was adjudged that rolls of this 3-layer composite tape would be cleanly unwindable after prolonged storage in roll form.

A piece of this 3-layer composite tape was thermoformed to provide a multi-compartment blister to which was contacted a paper-foil laminate in the same manner as in Example 5. After leaving the resulting medication card overnight at room temperature, the paper-foil laminate could not be peeled away without delaminating or tearing. Individual gelatin capsules punched from the card fell freely from blister compartments.

EXAMPLES 7-11

Copolymers having a high acrylonitrile content may be too firm to form good bonds without heating unless they are modified by a liquid copolymer such as "Nipol N-30L". Copolymers of lower acrylonitrile content which do form good bonds at room temperature can be made more tacky by being mixed with a liquid copolymer. Tapes of the invention were tested as follows:

|  | Example | | | | |
| --- | --- | --- | --- | --- | --- |
|  | 7 | 8 | 9 | 10 | 11 |
| "Hycar 1022" | 100 | 95 | — | — | — |
| "Hycar 1042F" | — | — | 100 | 95 | 75 |
| "Nipol N-30L" | — | 5 | — | 5 | 25 |
| 180° Peelback Value (N/dm) | 67 | 77 | 3 | 17 | 31 |
| Water Contact Angle | 75° | 81° | 17° | 21° | 20° |

As noted above, the 180° Peelback value is measured after 10 minutes dwell time. When fresh strips of tapes of Examples 7, 8, 10 and 11 were tested after dwelling overnight at room temperature, each backing broke.

The 180° Peelback value can sometimes be improved by briefly pouring warm water (30° C.) onto the surface of the adhesive copolymer layer and then drying at 65° C. for 30 minutes, thus removing surfactant from the surface of the test tapes, with results as follows:

|  | Example | | |
| --- | --- | --- |
|  | 9 | 10 | 11 |
| 180° Peelback Value (N/dm) | 32 | 67 | 64 |
| Water Contact Angle | 56° | 65° | 71° |

When fresh strips of the washed tapes of Examples 9-11 were tested as for 180° Peelback value except after dwelling overnight at room temperature, each backing broke.

We claim:

1. Adhesive tape comprising a backing and an essentially tack-free adhesive layer at least about 0.013 mm thick that consists essentially of an uncrosslinked, tackifier-free copolymer of (a) 10 to 50 weight percent of acrylonitrile and (b) 50 to 90 weight percent of at lest one of butadiene and isoprene, said copolymer having a Mooney viscosity of from about 45 to 95, and said adhesive copolymer layer having a water contact angle of at least 20°, said tape initially repositionably bonding at room temperature directly to substrates of polyvinyl chloride, polycarbonate, polystyrene, corona-treated polyester, acrylate, vinyl chloride-vinyl acetate copolymer, or shellac, the strength of the bond increasing in a short time after application to the extent that repositionability is no longer possible.

2. Adhesive tape as defined in claim 1 wherein said copolymer is hydrogenated.

3. Adhesive tape as defined in claim 1, the adhesive copolymer layer of which contains a filler.

4. A pouch formed of polyolefin with an opening that is releasably closed by a flap to which is permanently adhered an adhesive tape as defined in claim 3.

5. Adhesive tape as defined in claim 1 wherein monomer (a) provides from 20 to 40 weight percent of the copolymer.

6. Adhesive tape as defined in claim 1 wherein the backing has a low-adhesion surface, thus permitting the adhesive copolymer layer to be transfered.

7. An article to which is adhered a piece f the adhesive copolymer layer of the tape defined in claim 6.

8. Adhesive tape as defined in claim 6, the adhesive copolymer layer of which is discontinuous.

9. Adhesive tape as defined in claim 8, the adhesive copolymer layer of which forms an orderly pattern of closely spaced segments, the widths of which are small compared to the width of the tape.

10. Adhesive tape as defined in claim 1 wherein the water contact angle is at least 50°.

11. Adhesive tape as defined in claim 1, the adhesive copolymer layer of which is permanently bonded to the backing.

12. A container formed with an opening which is sealed by a piece of the adhesive tape defined in claim 10.

13. A container formed with an opening which is sealed by two pieces of adhesive tape, each extending across the opening at opposite faces, at least one of said pieces being an adhesive tape as defined by claim 11.

14. A container having a removable cap that is sealed to the container by a strip of adhesive tape as defined in claim 12.

15. A blister pack sealed with an adhesive tape as defined in claim 1.

16. The tape of claim 1 wherein the backing comprises a strong transparent thermoplastic film, the adhesive is transparent, and the exposed surface of the adhesive is covered by a thin transparent thermoplastic release layer which is strongly adherent to the film backing and to which said adhesive copolymer layer is poorly adherent.

17. A composite adhesive tape as defined in claim 16 wherein the film backing is a vinyl film and the release layer is a copolymer of ethylene and vinyl acetate.

18. A thermoformed blister formed from a piece of tape as defined in claim 16.

19. A thermoformed blister as defined in claim 18 having a plurality of compartments, and a punch-open membrane adhered to said adhesive layer at the flanges of the blister.

20. A blister as defined in claim 19 wherein the punch-open membrane is a paper-foil laminate.

21. A laminate comprising the tape of claim 1 bonded directly to a substrate of polyvinyl chloride, polycarbonate, polystyrene, corona-treated polyester, vinyl chloride-vinyl acetate copolymer, or shellac.

* * * * *

UNITED STATES PATENT AND TRADEMARK OFFICE
CERTIFICATE OF CORRECTION

PATENT NO. : 4,977,003
DATED : December 11, 1990
INVENTOR(S) : Brown et al.

It is certified that error appears in the above-identified patent and that said Letters Patent is hereby corrected as shown below:

Col. 1, line 40, "listers" should be --blisters--.

Col. 3, line 41, "envelops" should be --envelopes--.

Col. 5, line 47, "a L-threaded" should be --a threaded--.

Col. 10, line 10, "lest" should be --least--.

Col. 10, line 35, "piece f the" should be --piece of the--.

Signed and Sealed this

Eighteenth Day of January, 1994

Attest:

BRUCE LEHMAN

Attesting Officer      Commissioner of Patents and Trademarks